United States Patent
Miller et al.

(10) Patent No.: US 9,618,625 B2
(45) Date of Patent: Apr. 11, 2017

(54) SYSTEM AND METHOD FOR CONTINUOUS CARRIER WAVE RECONSTRUCTION

(71) Applicant: Apple Inc., Cupertino, CA (US)

(72) Inventors: Isaac T. Miller, El Granada, CA (US); William J. Bencze, Half Moon Bay, CA (US); Robert W. Brumley, San Mateo, CA (US); Brent M. Ledvina, San Francisco, CA (US); Mark L. Psiaki, Brooktondale, CA (US); Thomas J. Holmes, Palo Alto, CA (US); Clark E. Cohen, Washington, DC (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 14/244,828

(22) Filed: Apr. 3, 2014

(65) Prior Publication Data

US 2015/0042511 A1  Feb. 12, 2015

Related U.S. Application Data

(63) Continuation-in-part of application No. 13/935,885, filed on Jul. 5, 2013, now Pat. No. 9,360,557.
(Continued)

(51) Int. Cl.
  *G01S 19/13* (2010.01)
  *G01S 19/29* (2010.01)
(52) U.S. Cl.
  CPC .................... *G01S 19/29* (2013.01)
(58) Field of Classification Search
  CPC ........... G01S 19/13; G01S 19/29; G01S 19/23
(Continued)

(56) References Cited

U.S. PATENT DOCUMENTS 5,450,329 A  9/1995 Tanner
5,583,776 A  12/1996 Levi et al.
(Continued)

FOREIGN PATENT DOCUMENTS

KR  1020090087300  8/2009

OTHER PUBLICATIONS

International Search Report and Written Opinion in International Application No. PCT/US2015/022969, mailed Jun. 22, 2015, 12 pages.
(Continued)

*Primary Examiner* — Harry Liu
(74) *Attorney, Agent, or Firm* — Fish & Richardson P.C.

(57) ABSTRACT

A system and method of continuous carrier wave reconstruction includes a radio navigation receiver that includes one or more processors, memory coupled to the one or more processors, and an input for receiving a signal from a transmitter. The signal has a phase. The one or more processors are configured to obtain phase lock on the received signal, extract first phase information from the received signal, detect a loss in phase lock on the received signal, and extrapolate second phase information while phase lock is lost using a model of the phase. In some embodiments, the one or more processors are further configured to reconstruct the carrier signal based on the first and second phase information. In some embodiments, the one or more processors are further configured to scale the first and second phase information from a first nominal frequency of the received signal to a different second nominal frequency.

27 Claims, 6 Drawing Sheets

Related U.S. Application Data

(60) Provisional application No. 61/668,984, filed on Jul. 6, 2012, provisional application No. 61/691,661, filed on Aug. 21, 2012.

(58) Field of Classification Search
USPC .................................... 342/357.51, 357.62
See application file for complete search history.

(56) References Cited

U.S. PATENT DOCUMENTS

| | | | |
|---|---|---|---|
| 5,812,961 | A | 9/1998 | Enge et al. |
| 6,147,644 | A | 11/2000 | Castles et al. |
| 6,157,896 | A | 12/2000 | Castles et al. |
| 6,373,432 | B1 | 4/2002 | Rabinowitz et al. |
| 6,417,801 | B1 | 7/2002 | van Diggelen |
| 6,606,346 | B2 | 8/2003 | Abraham et al. |
| 6,651,000 | B2 | 11/2003 | van Diggelen et al. |
| 6,704,651 | B2 | 3/2004 | van Diggelen |
| 6,937,187 | B2 | 8/2005 | van Diggelen et al. |
| 7,042,392 | B2 | 5/2006 | Whelan et al. |
| 7,158,080 | B2 | 1/2007 | van Diggelen |
| 7,372,400 | B2 | 5/2008 | Cohen et al. |
| 7,489,926 | B2 | 2/2009 | Whelan et al. |
| 7,554,481 | B2 | 6/2009 | Cohen et al. |
| 7,579,987 | B2 | 8/2009 | Cohen et al. |
| 7,732,400 | B2 | 6/2010 | Stern et al. |
| 7,978,130 | B1 | 7/2011 | Cohen et al. |
| 8,035,558 | B2 | 10/2011 | Cohen et al. |
| 2005/0156782 | A1 | 7/2005 | Whelan et al. |
| 2005/0159891 | A1 | 7/2005 | Cohen et al. |
| 2008/0001818 | A1 | 1/2008 | Cohen et al. |
| 2008/0059059 | A1 | 3/2008 | Cohen et al. |
| 2009/0091493 | A1 | 4/2009 | Hwang et al. |
| 2009/0182502 | A1 | 7/2009 | Riter et al. |
| 2011/0068973 | A1 | 3/2011 | Humphreys |
| 2011/0093202 | A1 | 4/2011 | Thompson |
| 2011/0102259 | A1 | 5/2011 | Ledvina |
| 2011/0109506 | A1 | 5/2011 | Humphreys |
| 2011/0163913 | A1 | 7/2011 | Cohen |
| 2011/0238307 | A1 | 9/2011 | Psiaki et al. |
| 2011/0238308 | A1 | 9/2011 | Miller |
| 2013/0176059 | A1 | 7/2013 | Brauner |
| 2013/0234885 | A1* | 9/2013 | Geier ............... G01S 19/49 342/357.23 |
| 2013/0322870 | A1* | 12/2013 | Geyer ............... H04B 10/6165 398/25 |
| 2014/0062771 | A1* | 3/2014 | Lebrat ............... G01S 19/43 342/357.26 |

OTHER PUBLICATIONS

Anonymous: "Examples of single frequency Cycle-Slip Detectors—Navipedia," (Mar. 22, 2013), Retrieved from the Internet: URL:http://www.navipedia.net/index.php/Examples_of_Single_frequency_Cycle-Slip_Detectors [retrieved on Jun. 15, 2015], 1 page.

Blewitt, "An automatic editing algorithm for GPS data," Geophysical Res Letters, 17(3):199-202 (Mar. 1, 1990).

Rodriguez et al., "Real-Time Detection of Ionospheric Scintillations and Potential Applications," GNSS 2008—Proceedings of 21$^{st}$ Int'l Technical Meeting Satellite Div Institute Navigation, pp. 277-288 (Sep. 19, 2008).

Selected pp. 12-48; 125-127; 164-169; 218-219; 238-241; cover page; copyright page and table of contents from Misra, P., and Enge, P., The Global Positioning System: Signals, Measurements, and Performance Signal, Ganga-Jamuna Press, Revised Second Edition, 2012.

Alonso, R., and Shuster, M.G., "Complete Linear Attitude-Independent Magnetometer Calibration," Journal of the Astronautical Sciences, vol. 50, No. 4, Oct.-Dec. 2002, pp. 477-490.

Notification Concerning Transmittal of Copy of International Preliminary Report on Patentability, International Application No. PCT/US2015/022969, Oct. 13, 2016, 8 pages.

* cited by examiner

SYSTEM AND METHOD FOR CONTINUOUS CARRIER WAVE RECONSTRUCTION

CROSS-REFERENCE TO RELATED APPLICATIONS

This application is a continuation-in-part of U.S. patent application Ser. No. 13/935,885, filed Jul. 5, 2013, titled "SYSTEMS, METHODS, DEVICES, AND SUBASSEMBLIES FOR RAPID ACQUISITION TO HIGH-PRECISION POSITIONING, NAVIGATION AND/OR TIMING SOLUTIONS," which claims priority to U.S. Provisional Application No. 61/668,984 filed Jul. 6, 2012 and U.S. Provisional Application No. 61/691,661 filed Aug. 21, 2012, the disclosures of which are herein incorporated by reference.

BACKGROUND

This invention relates generally to radio navigation and positioning systems and, more specifically, to systems and methods for reconstructing continuous carrier wave signals despite gaps, discontinuities, and other variations in carrier signals.

Radio signals have been used as an aid to navigation and to obtain position estimates for decades. In much the same way that sailors could navigate near land using two or more light houses, the earliest systems used a directional antenna that determined a bearing to two or more radio transmitters. As long as line of sight could be maintained between the receiver and the two or more radio transmitters, a location of the receiver could be determined by triangulating the known locations of the two or more radio transmitters and the bearings to each of those radio transmitters. And although this approach may generally provide just a horizontal location (latitude and longitude) of the receiver, this may be adequate for localized navigation, such as the landing of aircraft or the navigation of ships around nearby navigational hazards.

Limiting radio navigation systems to local two-dimensional positioning, however, does not address many interesting positioning problems. For example, surveyors often desire to know the height/altitude of a location as well as its latitude and longitude, and pilots of aircraft often desire to know their altitude. To address these desires, more complex and longer distance radio navigation systems are typically utilized. Many of these radio navigation systems rely on the basic principle that radio waves generally propagate through the air at a known speed. By measuring the length of time it takes for a radio wave to propagate between a transmitter and a receiver, a distance between the transmitter and the receiver may be determined. By using the distance between the receiver and several transmitters with known locations, it is possible to determine the position of the transmitter by trilateration. For example, by using three transmitters, it is possible to determine the latitude, longitude, and altitude of the receiver. As additional transmitters are used and detected by the receiver, additional variables may be removed from the solution. For example, by adding time information to the radio signals, a fourth transmitter may be used to solve for the current time at the receiver.

Global Positioning Satellite (GPS) navigation, and more broadly Global Navigation Satellite System (GNSS) navigation, has become the standard for most military and civilian radio navigation applications. There exist in both military and civil sectors hundreds of millions of GPS or GNSS receivers that are used daily to provide real-time positioning and navigation. The GPS system is based on a constellation of approximately 24 to 32 middle-earth orbit (MEO) satellites that broadcast continuous carrier wave signals. A GPS receiver typically relies on the ability to receive signals from four or more satellites allowing the receiver to determine latitude, longitude, altitude, and time error at the receiver. For a typical GPS receiver, accuracy in location to within about 10 meters may be rapidly obtained.

A typical GPS receiver with an unobstructed view of the sky is generally able to receive signals from six or more satellites. However, local obstructions such as trees, terrain, buildings, and/or the like may often cause temporary or longer interruptions in the reception of the radio signals and/or make it difficult to receive the four signals used to determine the receiver position and time. To address these deficiencies in the GPS system, it may be possible to rely on signals from other transmitting sources, such as low earth orbit (LEO) satellites or ground-based transmitters. Unfortunately, these other signals may not be suitable for unaltered use with a conventional GPS receiver that is expecting to receive and possibly acquire and/or track a continuous carrier wave signal near a known or nominal frequency. Without these features, a GPS receiver may not be able to receive or process these other signals, which may result in a less accurate position and time solution or no solution availability at all.

Accordingly, it would be desirable to provide systems and methods for reconstructing continuous carrier wave signals at known frequencies for use with GPS receivers.

SUMMARY

According to one embodiment, a carrier reconstruction system associated with a radio navigation receiver includes one or more processors, memory coupled to the one or more processors, and an input for receiving a signal from a transmitter. The signal has a phase. The one or more processors are configured to obtain phase lock on the received signal, extract first phase information from the received signal, detect a loss in phase lock on the received signal, and extrapolate second phase information while phase lock is lost using a model of the phase.

According to another embodiment, a method for reconstructing a carrier signal in a radio navigation receiver. The method includes receiving a signal having a phase from a transmitter, obtaining phase lock on the received signal, extracting first phase information from the received signal, detecting a loss in phase lock on the received signal, extrapolating second phase information while phase lock is lost using a model of the phase, and reconstructing a carrier signal based on the first and second phase information.

According to yet another embodiment, a non-transitory machine-readable medium includes a first plurality of machine-readable instructions which when executed by one or more processors associated with a carrier reconstruction system are adapted to cause the one or more processors to perform a method. The method includes receiving a signal from a transmitter, the received signal having a phase, obtaining phase lock on the received signal, extracting first phase information from the received signal, detecting a loss in phase lock on the received signal, determining a position and a velocity of the transmitter, determining a position and a velocity of the radio navigation receiver, determining clock drift and bias for the radio navigation receiver, determining transmission media effects, applying a model of a derivative of the phase based on the determined transmitter position and velocity, the radio navigation receiver position and velocity, the radio navigation receiver clock drift and bias, and the transmission media effects to extrapolate second phase information while phase lock is lost, and reconstructing a carrier signal based on the first and second phase information.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, antennas, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, global navigation satellite systems, satellites, network control, and other such functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment. The invention may be implemented using any combination of hardware and software as may be appropriate given the particular circumstances.

Figure 1:
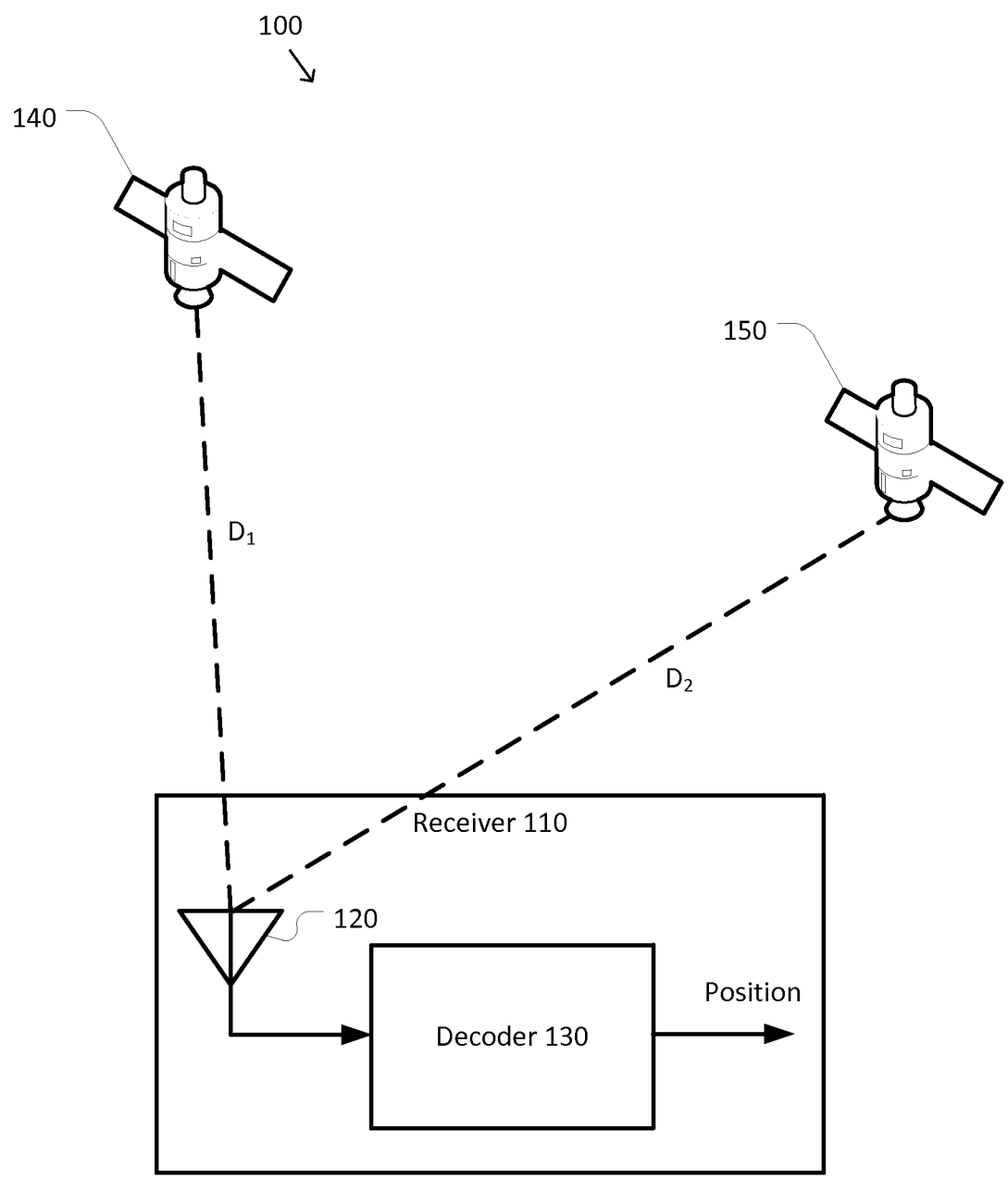
FIG. 1 is a simplified diagram of a radio navigation system according to some embodiments.

FIG. 1 is a simplified diagram of a radio navigation system 100 according to some embodiments. Radio navigation system 100 may be used to determine the position of a receiver 110. As shown in FIG. 1, receiver 110 includes an antenna 120 for receiving radio navigation signals and a position decoder 130. As antenna 120 receives one or more signals from various transmitters, they are passed on to position decoder 130, which determines and outputs a position for receiver 110. For example, the position may be used to locate receiver 110 on a map stored within a navigation system. As shown, receiver 110 and position decoder 130 are using trilateration to determine the position of receiver 110 relative to satellites 140 and 150. A distance $D_1$ is being determined between antenna 120 and satellite 140 and a distance $D_2$ is being determined between antenna 120 and satellite 150. Based on $D_1$ and $D_2$, as well as distances to other transmitters and/or other modeling constraints, position decoder 130 is able to determine the position of receiver 110.

As discussed above and further emphasized here, FIG. 1 is merely an example which should not unduly limit the scope of the claims. One of ordinary skill in the art would recognize many variations, alternatives, and modifications. In some embodiments, antenna 120 may receive signals from transmitters other than the two satellites shown. In some examples, antenna 120 may receive signals from additional satellites or even fewer satellite. In some examples, antenna 120 may receive signals from non-satellite-based transmitters, include terrestrial-based transmitters with fixed and known locations. In some embodiments, the position of receiver 110 may be fixed and the position decoder 130 may be used to estimate errors or perturbations in various components of radio navigation system 100 and/or to determine corrections in the locations of one or more of the transmitters.

Position decoder 130 may use several methods to determine one or more distances, such as the distances $D_1$ and $D_2$. For example, when the position decoder 130 knows both the time when a signal leaves satellite 140 or satellite 150 and when that same signal arrives at antenna 120, position decoder 130 may determine distance $D_1$ or $D_2$, respectively, based on the time of flight of the respective signal. For example, each respective signal from satellites 140 and 150 could be encoded with the time when it was transmitted and this may be compared to the time when the respective signal arrives at the receiver. In this approach, the clocks at satellites 140 and 150 and receiver 110 should be synchronized with high accuracy because an error between the two clocks of 1 µs may result in an error of around 300 meters in determining the distance between satellite 140 and/or 150 and the receiver 110. One way of managing clock synchronization may be to provide additional signals from other transmitters that position decoder 130 may use to synchronize the receiver clock with the clocks of the transmitters. For example, the GPS system uses signals from four satellites to provide a GPS receiver with both position and time estimates relative to the synchronized time maintained by the GPS satellites.

To simplify some of the computations and to improve both the precision and accuracy of the distances and the resulting position determined by receiver 110, receiver 110 may use carrier phase tracking. In carrier phase tracking, receiver 110 tracks changes in the phase of the carrier wave signal received from each of the satellites in comparison to a reference signal generated at the receiver. By correlating the reference signal to the received carrier wave signal a carrier beat signal may be generated and tracked. In an ideal arrangement where both a transmitter and a receiver are stationary relative to each other and both the transmitter and the receiver clocks are synchronized, the difference in phase between the reference signal and the received signal would be constant and this may be observed in the carrier beat signal. Unfortunately, even though the phase difference is constant, the whole number of cycles of the carrier wave between the transmitter and receiver are not readily known. This is often called the carrier phase ambiguity. As the transmitter and receiver move relative to each other, the phase shifts as fewer or more wavelengths in the carrier wave signal occur between the transmitter and the receiver introducing Doppler-shift like effects. Each of the changes in phase is indicative of the change in relative distance or range between the transmitter and the receiver. As these phase changes are tracked and monitored over time, and additional information is known about the relative motion/location between the transmitter and receiver, it is possible to determine the number of wave lengths and thus derive the distance between the transmitter and the receiver.

Figure 2:
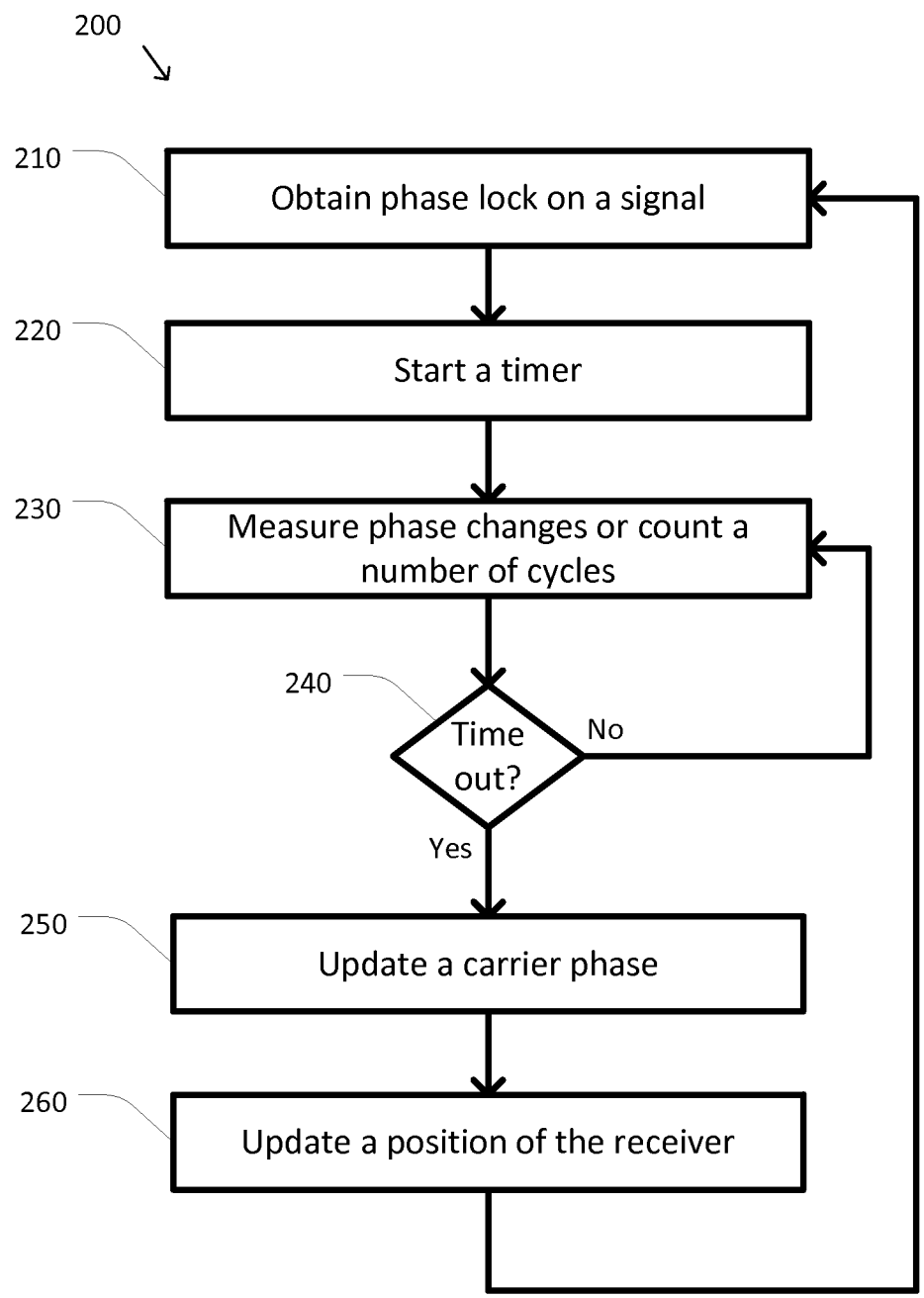
FIG. 2 is a simplified diagram of a method of carrier phase tracking according to some embodiments.

FIG. 2 is a simplified diagram of a method 200 of carrier phase tracking according to some embodiments. In some embodiments, one or more of the processes 210-260 of method 200 may be implemented, at least in part, in the form of executable code stored on non-transient, tangible, machine readable media that when run by one or more processors (e.g., the one or more processors associated with receiver 110 and/or position decoder 130) may cause the one or more processors to perform one or more of the processes 210-260. In some examples, method 200 may be implemented in a GPS receiver. In some embodiments, process 260 is optional and may be omitted.

At a process 210, phase lock is obtained on a signal. In order to perform carrier phase tracking, a receiver first receives a signal from a transmitter, such as either of the satellites 140 or 150, and then obtains a phase lock on the signal. Once the receiver has a phase lock it may correlate the received signal with the reference signal generated by the receiver to create the carrier beat signal.

At a process 220, a timer is started. To begin tracking of the phase changes in the carrier beat signal and/or the signal from the transmitter the timer is used to mark the beginning of a monitoring interval.

At a process 230, phase changes are measured or a number of cycles are counted. While the timer started during process 220 marks off the monitoring interval, the phase changes in the carrier beat signal and/or the signal from the transmitter are monitored. When lesser precision or accuracy is desired, the monitoring may include counting the whole number of cycles of phase change in the carrier beat signal and/or the signal from the transmitter. When greater precision or accuracy is desired a more precise measurement of the phase change may be obtained by integrating the phase difference signal. In some examples, the phase changes may be measured by tracking the carrier Doppler shift, which is the first-order derivative of the beat carrier phase.

At a process 240, it is determined whether the timer has timed out. The monitoring interval started with the timer during process 220, continues until the timer times out. Until the timer times out, the monitoring and/or counting of process 230 continues. When the timer times out, the change in carrier phase over the monitoring interval is further processed beginning with a process 250.

At the process 250, a carrier phase observable is updated. This observable is a function of distance between the transmitter and the receiver and possibly other effects and may be determined based on the monitored phase change collected during the most recent monitoring interval as is known in the art of radio navigation and GPS range finding.

At an optional process 260, a position of the receiver may be updated. The carrier phase observables updated during process 250 as well as the updated carrier phase observables for other transmitter carrier wave signals may then be used to determine the position for the receiver. The position may include one or more of latitude, longitude, altitude, and/or time at the receiver.

In order for the carrier phase tracking of method 200 to operate properly, the receiver should maintain constant phase lock with the signal from the transmitter throughout the entire monitoring interval created by the timer. When phase lock is not maintained, it is not possible to know whether there has been a change in the whole number of wave lengths in the carrier wave between the transmitter and receiver. Thus, when phase lock is lost, it may result in computation of incorrect carrier phase observables during process 250 and thus an incorrect determination of receiver position during process 260. As a consequence, in order to maintain higher precision and accuracy in position of the receiver, it is important to provide the receiver with a continuous carrier wave signal that is not interrupted.

Unfortunately, it is not always possible to obtain a continuous carrier wave signal without interruptions at a receiver. When line of sight between the transmitter and receiver is lost due to an obstruction, such as a building, the phase lock may be lost as well. Electromagnetic interference may cause a loss of phase lock. And some transmitters may not continuously transmit a carrier wave, such as those transmitters broadcasting time-division multiplexed (TDMA) signals. For example, the Iridium constellation of communication satellites may broadcast each carrier wave for only 8.28 ms out of every 90 ms.

Other factors may also impact the accuracy of the carrier phase observables and positions determined by method 200. Some transmitters may introduce arbitrary signal changes into carrier wave signals. For example, the Iridium satellites may introduce phase shifts between each of the 8.28 ms TDMA signal bursts that they transmit. In addition, GNSS receivers are generally designed to perform carrier phase tracking of carrier wave signals that are centered on a constant nominal frequency, e.g. 1575.42 MHz for GPS L1. Any carrier wave signal that differs significantly from its expected nominal frequency or changes frequencies during transmission may not be tracked properly by a typical GNSS receiver even though it may still provide a continuous carrier wave signal.

Thus, even though many potential signal sources may be usable as the basis for a radio navigation system, a conventional GNSS positioning unit implementing carrier phase tracking may not be able to take advantage of them. This may because they do not provide a continuous carrier wave, introduce arbitrary signal changes, or simply transmit at the wrong frequency or at a changing frequency. Accordingly, it would be advantageous to provide a radio navigation system that could reconstruct continuous carrier waves that may be suitable for use with a GNSS positioning unit even when the carrier waves originate from transmitters other than typical GNSS constellations of satellites.

Figure 3:
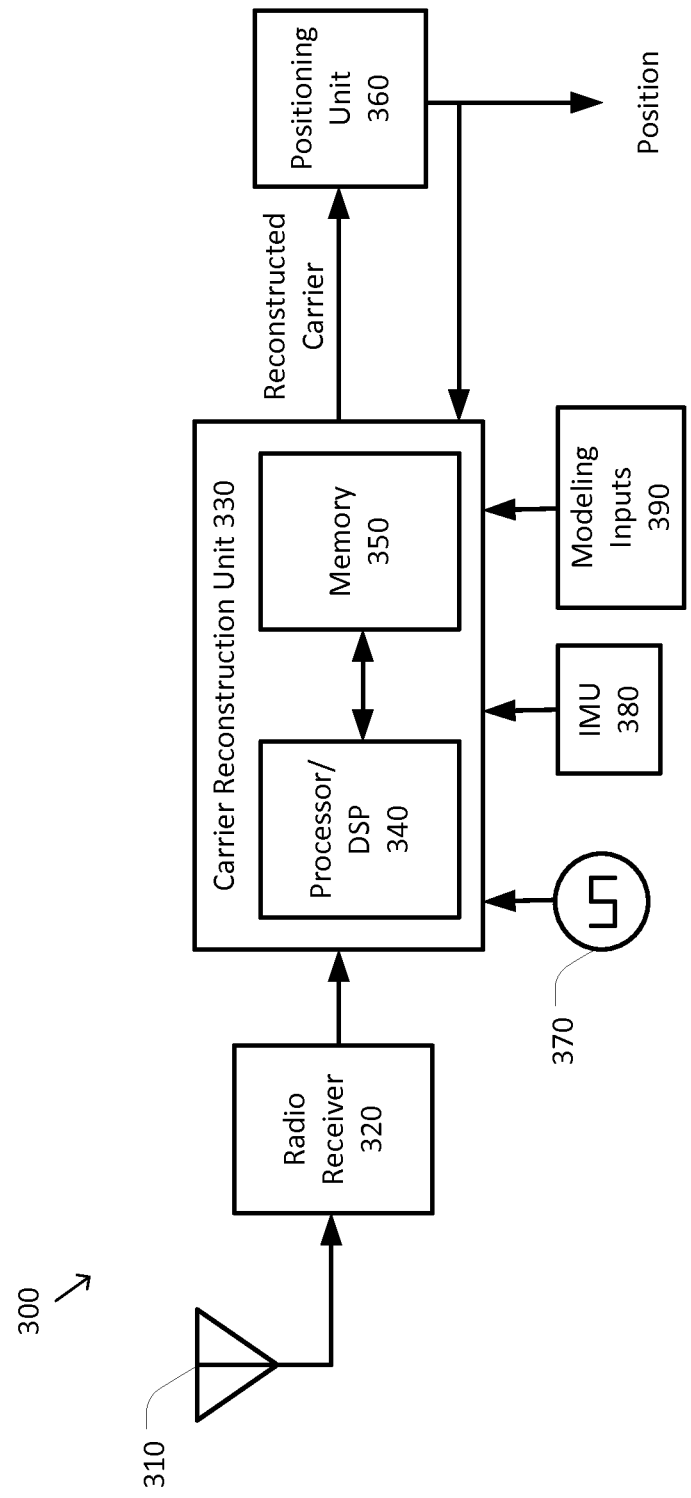
FIG. 3 is a simplified diagram of a radio navigation receiver using carrier wave signal reconstruction according to some embodiments.

FIG. 3 is a simplified diagram of a radio navigation receiver 300 using carrier wave signal reconstruction according to some embodiments. Radio navigation receiver 300 may be used to determine the position of a receiver associated with an antenna 310. Radio navigation system 300 operates by receiving a signal from a transmitter at antenna 310. The received signal is passed to a radio receiver 320, where the received signal is conditioned for use by a carrier reconstruction unit 330. For example, radio receiver 320 may employ various filtering and amplification techniques to extract the received signal from among a background of other electromagnetic signals and amplify it to have sufficient signal strength for use by the carrier reconstruction unit 330. Radio receiver 320 may also be used to obtain a phase lock on the received signal. The received signal may be transmitted by any suitable radio transmitting source including terrestrial-based transmitters; LEO satellites, such as the Iridium communication constellation; MEO satellites such as the GPS, GLONASS, or Galileo constellations, and/or geo-stationary satellites. The radio navigation receiver 300 may be associated with either a fixed and/or movable position.

The carrier reconstruction unit 330 includes at least one processing unit 340 and memory 350. In some examples, processing unit 340 may control operation and/or execution of hardware and/or software in carrier reconstruction unit 330. Although only one processing unit 340 is shown, carrier reconstruction unit 330 may include multiple processors, multi-core processors, microprocessors, microcontrollers, digital signal processors, custom processors/field programmable gate arrays (FPGAs)/application specific integrated circuits (ASICs), and/or the like. Memory 350 may be used to store one or more software and/or firmware applications as well as various data structures to be used during the carrier reconstruction process. Memory 350 may also include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The carrier reconstruction unit 330 reconstructs a continuous carrier wave to produce a carrier phase observable suitable for use with a positioning unit 360. In some embodiments, the positioning unit 360 may be a GPS unit, a GNSS unit, a radio navigation unit, and/or the like. To be suitable for use by the positioning unit 360, the reconstructed carrier wave signal should be a continuous carrier wave signal centered on a nominal frequency $f_0$ so that the positioning unit 360 may use its carrier phase observables as if they were produced from the carrier phase tracking of method 200. In some examples, the nominal frequency $f_0$ may be 1621.0 MHz. In some examples, the carrier reconstruction unit determines the appropriate carrier phase $\Phi_0$ for the reconstructed carrier signal and generates the reconstructed carrier wave signal according to Equation 1. In some examples, the carrier phase $\Phi_0$ is a function of time and varies constantly based on changing positions of the transmitter, the radio navigation receiver 300, as well as other modeling factors to be discussed in greater detail below. Further as the carrier phase $\Phi_0$ varies over time it introduces Doppler-like effects in the reconstructed carrier phase signal that result in shifts about the nominal frequency $f_0$.

$$\text{Reconstructed Carrier} = \sin(2\pi f_0 t + \Phi_0) \tag{1}$$

Using the reconstructed carrier signal, the positioning unit 360 determines a position for the radio navigation receiver 300, which is also fed back to the carrier reconstruction unit. The carrier reconstruction unit 330 is designed to reconstruct the carrier phase $\Phi_0$ even though the received signal may not be continuous nor at the nominal frequency. Additionally, the carrier reconstruction unit 330 is able to work with received signals for which continuous phase lock cannot be maintained, such as signals transmitted using TDMA that introduce time gaps in the received signal. To handle any losses in phase lock on the received signal, the carrier reconstruction unit 330 is able to extrapolate carrier phase values during each period of lost phase lock. The carrier reconstruction unit 330 is also capable of scaling carrier phase values between nominal frequencies to accommodate, for example, signals transmitted using frequency-division multiplexing (FDMA). The carrier reconstruction unit 330 is able to adjust the phase of the reconstructed carrier signal despite these changes in the nominal frequency of the received signal. In some embodiments, the carrier phase reconstruction unit 330 may also account for arbitrary signal changes in the received signal introduced by the transmitter. In some embodiments, the carrier phase reconstruction unit 330 may also be able to combine carrier phase information from more than one received signal received from the same transmitter so as to provide even more accurate carrier phase values for the reconstructed carrier wave signal.

In order to handle any gaps in the received signal, the carrier reconstruction unit 330 models the phase $\Phi$ of the received signal. For example, the phase of a received signal between a transmitter and a receiver may be modeled using Equation 2.

$$\Phi = \frac{2\pi}{\lambda}\{r + c(T - I + \delta t_r - \delta t^s)\} + 2\pi N + \text{noise} \tag{2}$$

In the model of Equation 2, $\lambda$ is the wavelength of the received signal and c is the speed of light. The range or distance between the transmitter and the receiver is represented by r and may include information based on the position determined by the positioning unit 360 as well as modeling information about the location of the transmitter. For example, when the transmitter is associated with a satellite, r may be determined in part based on ephemerides of the satellite. I models the carrier phase advance through the ionosphere or upper atmosphere and may be based on plasma dynamics, solar flares, and other phenomena. T models the carrier phase delay through the troposphere or lower atmosphere and may be dependent upon local weather. The error in the receiver clock relative to the true system time is modeled by $\delta t_r$ and the error in the transmitter/satellite clock relative to the true system time is modeled by $\delta t^s$ and may include both clock drift and frequency errors at the receiver and transmitter, respectively. N represents the carrier phase ambiguity and a noise term is included to account for other un-modeled errors, such as receiver thermal noise. Depending upon the location of the transmitter and receiver, one or more of the modeling elements may be omitted. For example, ionosphere effects may be ignored for terrestrial radio navigation systems where both the receiver and transmitter are both located below the ionosphere.

To generate the reconstructed carrier according to the model of Equation 2, the carrier reconstruction unit 330 may be coupled to various input sources. As shown in FIG. 3, the carrier reconstruction unit 330 is coupled to a receiver clock generator 370, an inertial measurement unit (IMU) or inertial navigation system (INS) 380, and additional modeling inputs 390. Receiver clock generator 370 provides the carrier reconstruction unit 330 with an approximate value of the true system time. Receiver clock generator 370 is at least partially synchronized to the true system time, but any variations in frequency and clock drift are included in $\delta t_r$. IMU 380 may be used to provide carrier reconstruction unit 330 with velocity and/or acceleration information for the radio navigation receiver 300. In some embodiments, IMU 380 may be omitted with any velocity and/or acceleration information being computed based on a velocity solution provided by positioning unit 360 or numerical derivatives of the position provided by positioning unit 360. The additional modeling inputs 390 may be used to supply carrier reconstruction unit 330 with ionosphere, troposphere, and/or transmitter clock information. In some embodiments, one or more of the additional modeling inputs 390 may be received directly or indirectly from one or more calibration receivers located at fixed and known locations.

Figure 4:
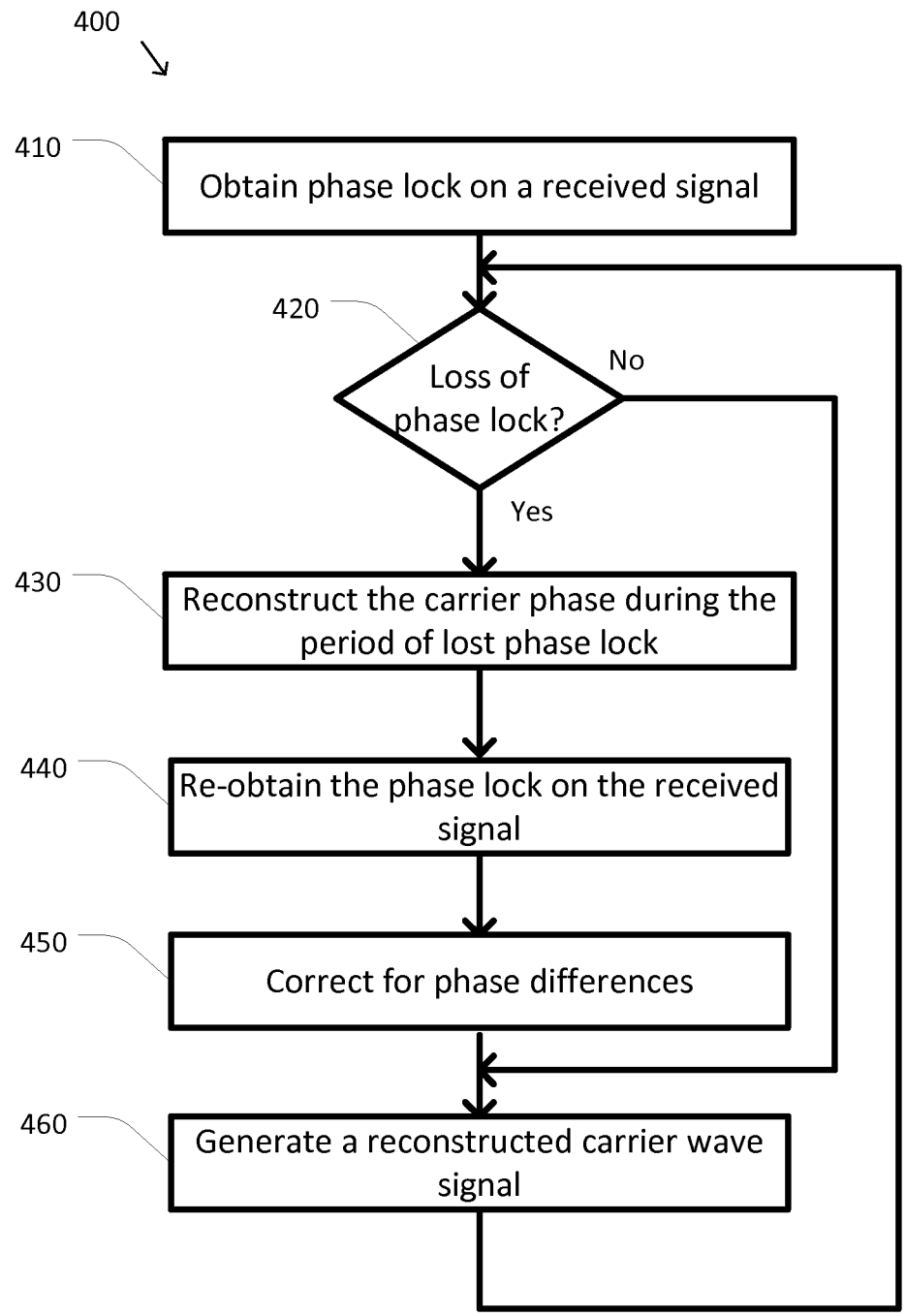
FIG. 4 is a simplified diagram of a method of carrier wave signal reconstruction according to some embodiments.

FIG. 4 is a simplified diagram of a method 400 of carrier wave signal reconstruction according to some embodiments. In some embodiments, one or more of the processes 410-460 of method 400 may be implemented, at least in part, in the form of executable code stored on non-transient, tangible, machine readable media that when run by one or more processors (e.g., the processing unit 340) may cause the one or more processors to perform one or more of the processes 410-460. In some examples, method 400 may be implemented, at least in part, in carrier reconstruction unit 330.

At a process 410, phase lock is obtained on a received signal. In order to perform carrier wave signal reconstruction, phase lock is first obtained from a signal received from a transmitter. For example, the received signal may be received at antenna 310. In some examples, the received signal may also be examined to determine its transmission source. In some examples, data and/or other information embedded in the received signals may be used to determine the transmission source.

At a process 420, it is determined whether phase lock is lost on the received signal. As long as the received signal continues to be received at the antenna with a suitable phase lock, its carrier phase may be extracted from the received signal and used to determine the phase of the reconstructed carrier wave signal as will be discussed in more detail with respect to process 460 and FIG. 6. However, when the received signal includes a change in signal dynamics that result in a loss of phase lock, it is no longer possible to continuously extract phase information directly from the received signal. In some examples, the change in signal dynamics may result from time gaps in the received signal, such as those that result from TDMA transmission of the received signal and/or obstructions affecting signal reception. In some examples, the change in signal dynamics may result from frequency shifts due to FDMA and/or phase shifts that result in a singularity in the signal dynamics. When phase lock is lost, the carrier phase is reconstructed across the period of lost phase lock beginning with a process 430.

At the process 430, the carrier phase is reconstructed during the period of lost phase lock. Because the received signal is not reliably available while phase lock is lost, the carrier phase of the received signal may be reconstructed using numerical approaches. In general, these numerical approaches are limited to those that can extrapolate a signal or function based on previously received values and one or more models of the signal or function. Interpolative approaches may not be generally useful in this context because for other than the shortest gaps, it may not be possible to reconstruct a continuous carrier wave output by waiting for phase lock to be re-obtained on the received signal.

Figure 5:
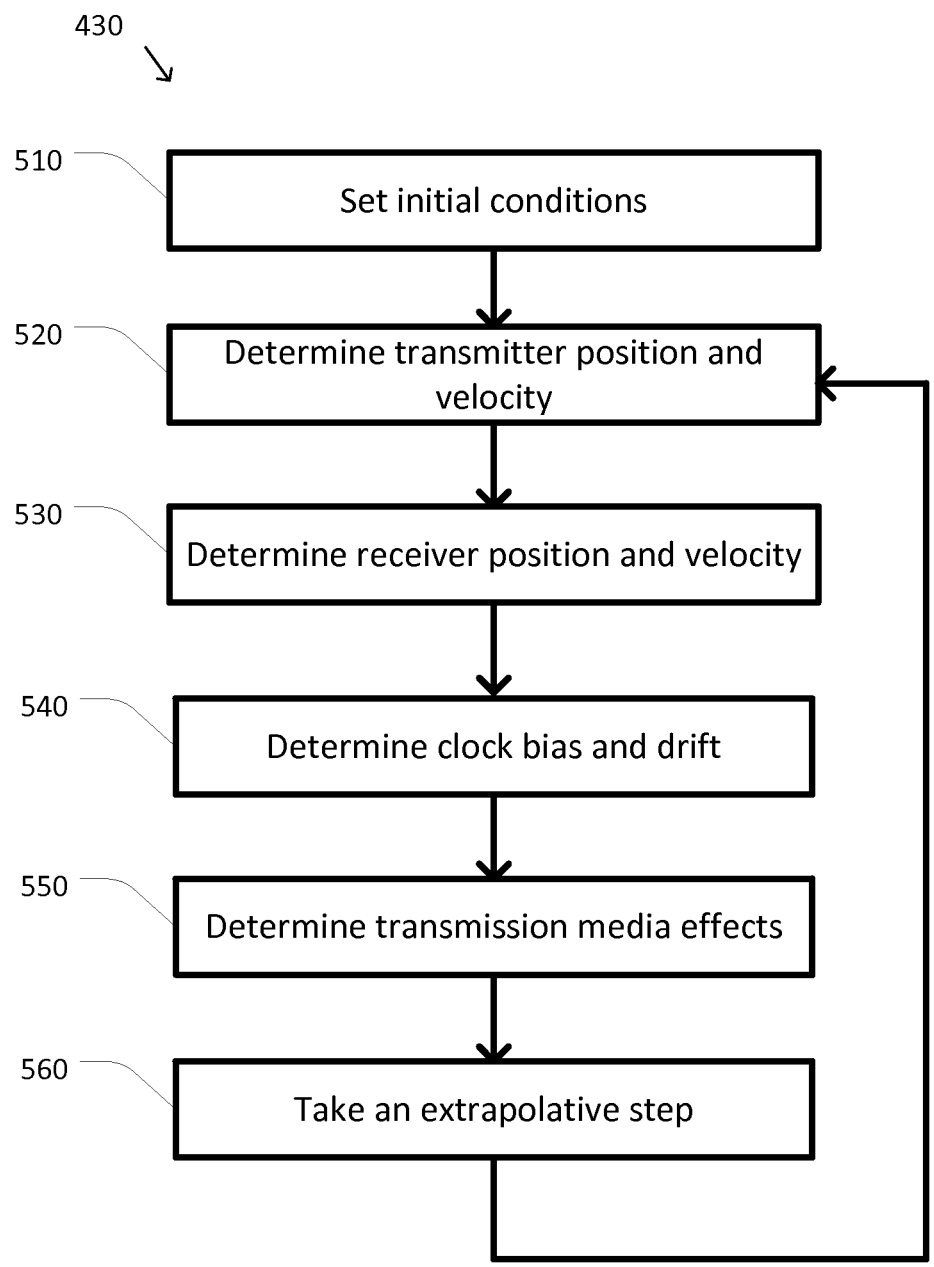
FIG. 5 is a simplified diagram of a process of reconstructing a carrier phase across a gap according to some embodiments.

FIG. 5 is a simplified diagram of the process 430 of reconstructing a carrier phase across a gap according to some embodiments. As shown in FIG. 5, process 430 reconstructs the carrier phase of the received signal by using a numerical extrapolation method. Numerical extrapolation methods typically rely on a Taylor series expansion of a function or signal that is to be extrapolated. Depending upon the particular method, the extrapolation may be performed using either sampled data from the function or signal or modeling of the function or signal using differential equations. Where the behavior of the function is potentially very dynamic, such as is often the case with radio navigation signals, an extrapolation method based on differential equations may be preferred. These extrapolation methods include the Euler method, Runge-Kutta methods, and/or the like. To use differential equation modeling, such as with the Runge-Kutta methods, it is typically helpful to use closed-form equations for at least the first-order derivative of the function or signal being modeled. For extrapolation of carrier phase, this involves the first-order derivative of the carrier phase Φ of the received signal from Equation 2. One version of the first-order derivative of Φ, representing the Doppler shift in the received signal, is shown in Equations 3 and 4.

$$\dot{\Phi} = \frac{2\pi}{\lambda}\{\dot{r} + c(\dot{T} - \dot{I} + \delta f_r - \delta f^s)\} \tag{3}$$

$$\dot{\Phi} = \frac{2\pi}{\lambda}\{(\vec{v}^s - \vec{v}_r)\cdot\hat{u} + c(\dot{T} - \dot{I} + \delta f_r - \delta f^s)\} \tag{4}$$

Focusing on Equation 4, the first order derivative of the carrier phase Φ depends on the wavelength, λ, of the received signal, the relative velocity between the receiver and the transmitter, $(\vec{v}^s - \vec{v}_r)$, the receiver to transmitter line of sight unit vector, û, the change in ionosphere advance, İ, the change in troposphere delay, Ṫ, the clock drift/frequency error in the receiver, $\delta f_r$, and the clock drift/frequency error in the transmitter, $\delta f^s$. As shown in Equation 4, the component of the relative velocity between the transmitter and the receiver along the line of sight unit vector û is used in the first-order derivative of the carrier phase Φ as represented by the dot product being taken between the relative velocity vector and the line of sight unit vector û. The model for the first-order derivative of the carrier phase Φ makes several simplifying assumptions regarding the behavior of the components that affect the carrier phase Φ. For example, Equation 4 assumes that the clock drift/frequency error in the receiver $\delta f_r$ and transmitter $\delta f^s$ are small with respect to their nominal clock frequencies so that small nonlinear terms resulting from the difference in the length of a receiver second and transmitter second can be ignored. In practice this is may not be true if, for example, a low-quality oscillator is used in either the receiver or transmitter. The changes in the frequency f are denoted by $\delta f_r$.

In some embodiments, more complex models for the first-order derivative of the carrier phase Φ may be used in place of Equation 4. For example, U.S. Patent Application Publication No. 2011/0238307, entitled "Vehicle Navigation Using Non-GPS LEO Signals and On-Board Sensors," which is hereby incorporated by reference, describes a more complex modeling for the first-order derivative of the carrier phase Φ, which is shown in Equation 5.

$$\Phi = \frac{2\pi}{\lambda}\{-(1+\delta f_l)[((\vec{v}^s - \vec{v}_r)\cdot \hat{u} + c(\dot{T} - \dot{I}))(1-\delta f_r) + \delta f_r] + \delta f_l\} \quad (5)$$

Referring back to FIG. 5, the sub-processes 510-560 of process 430 describe embodiments for modeling and determining the various components of the first-order derivative of the carrier phase Φ. At a process 510, initial conditions are set for the carrier phase Φ. The initial conditions or initial value for the carrier phase Φ may be set based on the phase of the carrier determined by the phase lock obtained by the receiver on the received signal. The initial conditions for the carrier phase Φ may be based on the last phase observed in the received signal at the start of the period of lost phase lock. In some embodiments, at the first gap in the received signal, the initial conditions for the carrier phase Φ may be set to any value as the actual phase of the reconstructed carrier wave signal is not as important as the changes in the carrier phase Φ over time.

At a process 520, transmitter position and velocity are determined. The transmitter velocity $\vec{v}^s$ is used directly in Equations 4 and/or 5, and the transmitter position may be used to determine the line of sight unit vector $\hat{u}$. For transmitters with a fixed position, the position of the transmitter is known and the velocity $\vec{v}^s$ may be simplified to zero. However, when the transmitter is in motion, such as when the transmitter is located on a satellite, more complex models for the transmitter position and velocity may be used. For example, when the transmitter is located on a satellite, ephemerides may be used to model both the transmitter position and velocity. The ephemerides for many satellites are typically available and are suitable for use with Equation 4. The ephemerides are typically provided as tables of satellite position and velocity over time, as polynomial coefficients, or as Keplerian orbital elements and some perturbations. The ephemerides may be uploaded to the satellites or other data sources and may be made available to radio navigation and other receivers. The values of the ephemerides are typically generated by an external provider using traditional satellite tracking techniques that may include other corrections. With an estimate of the system time, the transmitter position and velocity may be determined by using the system time to compute satellite positions and velocities from the ephemerides.

At a process 530, receiver position and velocity are determined. The receiver velocity $\vec{v}_r$ is used directly in Equations 4 and/or 5, and the receiver position may be used to determine the line of sight unit vector $\hat{u}$. For receivers with a fixed position, the position of the receiver is known and the velocity $\vec{v}_r$ may be simplified to zero. However, when the receiver is in motion, such as when the receiver is located in a moving vehicle, more complex models for the receiver position and velocity may be used. The receiver position may be determined using the position provided by the radio navigation receiver, such as the position provided by the positioning unit 360 in the radio navigation receiver 300. In some embodiments, an IMU, such as the IMU 380, may be used to determine the receiver velocity $\vec{v}_r$. In some embodiments, the receiver velocity $\vec{v}_r$ may be determined using by taking a numerical derivative of the receiver position. In some embodiments, the receiver velocity $\vec{v}_r$ may be determined from a velocity solution provided by the positioning unit 360.

At a process 540, clock drift and bias are determined. Clock drift and bias in the transmitter may generally be minimized by time synchronization algorithms and correction mechanisms that work to keep timing errors between related transmitters to a minimum. For example, the operators of the GPS satellites and the Iridium satellites generally keep clock drift and bias to levels that are often much lower than clock drift and bias in the receivers.

The receiver clock bias $\delta t_r$ and clock drift $\delta f_r$ may be determined in incremental steps from time $t_k$ to $t_{k+1}$ using a model with random walk components as shown in Equations 6-10 where $\Delta t_k = t_{k+1} - t_k$.

$$\begin{bmatrix} \delta t_R(t_{k+1}) \\ \delta f_R(t_{k+1}) \end{bmatrix} = \begin{bmatrix} 1 & \Delta t_k \\ 0 & 1 \end{bmatrix} \begin{bmatrix} \delta t_R(t_k) \\ \delta f_R(t_k) \end{bmatrix} + \sqrt{\Delta t_k} \begin{bmatrix} a_k & 0 \\ b_k & c_k \end{bmatrix} w_{clk} \quad (6)$$

$$a_k = \sqrt{S_f + \frac{1}{3}S_g \Delta t_k^2}, \quad (7)$$

$$b_k = \frac{\frac{1}{2}S_g \Delta t_k}{\sqrt{S_f + \frac{1}{3}S_g \Delta t_k^2}} \quad (8)$$

$$c_k = \sqrt{\frac{S_f S_g + \frac{1}{12}S_g^2 \Delta t_k^2}{S_f + \frac{1}{3}S_g \Delta t_k^2}} \quad (9)$$

$$S_f = \frac{1}{2}h_0 \text{ and } S_g = 2\pi^2 h_{-2} \quad (10)$$

The tuning parameters $h_0$ (given in seconds units) and $h_{-2}$ (given in 1/sec units) are parameters of the power law model of a receiver clock, which can be derived from the Allan variance plot of the receiver clock. The 2-dimensional receiver clock process noise vector $w_{clk}$ is a zero-mean Gaussian discrete-time white-noise process with covariance matrix equal to the identity matrix.

At a process 550, transmission media effects are determined. As the received signal propagates from the transmitter to the radio navigation receiver, the transmission media may alter the phase of the received signal. The transmission media effects are generally modeled by the ionosphere (I) and troposphere (T) elements in Equations 2-5. The ionosphere or upper atmosphere typically advances the phase of the received signal and may be based on plasma dynamics, solar flares, and other phenomena. The troposphere or lower atmosphere typically delays the phase of the received signal and may be dependent upon local weather. Depending upon the location of the transmitter and radio navigation receiver, one or more of the transmission media effects may be omitted. For example, ionosphere effects may be ignored for terrestrial radio navigation systems where both the receiver and transmitter are both located below the ionosphere.

The ionosphere extends from about 90 km to 1600 km above the surface of the earth and is composed of plasma containing free electrons and ions. This plasma affects electromagnetic waves in very predictable ways that should be accounted for in navigation systems. The speed of propagation of radio signals through the ionosphere depends on the number of free electrons in the path of the radio signal. During night time hours the number of free electrons in the ionosphere maintains a relatively low and stable value, but during the day solar radiation and/or solar flares significantly increase the level of free electrons in the ionosphere and thus the impact the ionosphere may have in the phase reconstruction models of Equations 4 and 5.

Many models exist for determining the ionosphere delay I. Some models are empirical in nature, such as the empirical models delivered by some satellite-based augmentation systems (SBAS), and others are based on first principles, such as those based on measurements made at two different nominal carrier frequencies broadcast from the same transmitter. In some embodiments, the effect of the ionosphere may be modeled using the Klobuchar Model. The Klobuchar Model is based on a four-parameter zenith model of the effect the ionosphere has on a radio signal traveling vertically between a transmitter and receiver that are respectively above and below the ionosphere. The Klobuchar Model is shown in Equation 11.

$$\tilde{I} = \begin{cases} c\left[A_1 + A_2\cos\left(\frac{2\pi(t--A_3)}{A_4}\right)\right], & |t - A_3| < \frac{A_4}{4} \\ cA_1 & \text{otherwise} \end{cases} \quad (11)$$

The four parameters, $A_1$-$A_4$, may be provided to the radio navigation receiver. For example, $A_1$-$A_4$ are periodically transmitted by the GPS satellite transmitters for reception and use by GPS receivers. The ionosphere advance I, from Equation 2, may be derived from Equation 11 by adjusting $\tilde{I}$ to account for the increased distance the received signal travels through the ionosphere when, for example, the transmitter is not located directly above the radio navigation receiver. This adjustment may be determined by knowing the line of sight unit vector determined using the transmitter and receiver positions obtained during processes 520 and 530. In some embodiments, $\tilde{I}$ may be multiplied by the obliquity factor OF of Equation 12 to make this adjustment, where $\zeta$ is the angle of the satellite from the zenith and is derivable from the line of sight unit vector $\hat{u}$, $R_E$ is the average radius of the earth, and $h_I$ is the mean ionospheric height, which typically ranges from 300 to 400 km.

$$OF = \sqrt{1 - \left(\frac{R_E \sin \zeta}{R_E + h_I}\right)^2} \quad (12)$$

In some embodiments, the adjustment may additionally account for any partial thickness of the ionosphere when the received signal travels through part of the ionosphere. For example, this occurs when the transmitter is associated with a LEO satellite, such as an Iridium satellite, for which a portion of the ionosphere is above the satellite. The Klobuchar Model of Equation 11 is also dependent on the frequency of the received signal and should be adjusted when the parameters $A_1$-$A_4$ for one frequency are adapted to a received signal of another frequency by scaling the ionosphere advance by the square of the ratio of the frequencies. For example, when the Klobuchar parameters from the GPS L1 signal are adapted for use with received signals of frequency f, the values of Equation 11 are multiplied by the factor $[(1575.42 \times 10^6)/f]^2$. In some embodiments, when values are used for the ionosphere change $\dot{I}$ in Equations 4 and/or 5, $\dot{I}$ may be determined by either using a closed form derivative of Equation 11, including any position and frequency adjustments, or by determining $\dot{I}$ numerically from computed values for I.

Many models exist for determining the troposphere delay T. In some embodiments, the troposphere delay T may be derived from the Saastamoinen models of the zenith hydrostatic delay and the zenith wet delay of a radio signal traveling vertically through the entire thickness of the troposphere as shown, respectively, in Equations 13 and 14.

$$\tilde{T}_d = 0.002277(1 + 0.0026\cos 2\theta + 0.00028H)P_0 \quad (13)$$

$$\tilde{T}_w = 0.002277\left(\frac{1255}{T_0} + 0.05\right)e_0 \quad (14)$$

$T_0$, $P_0$, and $e_0$ are, respectively, the temperature in Kelvin, the total pressure, and the partial pressure due to water vapor at the radio navigation receiver. In some examples, $T_0$, $P_0$, and $e_0$ may be determined from temperature, atmospheric pressure, and relative humidity readings taken near the radio navigation receiver. H is the orthometric height of the radio navigation receiver, and $\theta$ is the latitude of the radio navigation receiver. In some examples, H and $\theta$ may be determined from the radio navigation receiver position obtained during process 520. Like the ionosphere advance, I, the zenith hydrostatic delay $\tilde{T}_d$ and the zenith wet delay $\tilde{T}_w$ may also be adjusted to account for the effects when the transmitter and receiver are not located vertically relative to each other. In some embodiments, hydrostatic and wet elevation mapping functions may be used to combine the zenith hydrostatic delay $\tilde{T}_d$ and the zenith wet delay $\tilde{T}_w$ to determine the troposphere delay T, with one such example being shown in Equations 15-17.

$$T = \tilde{T}_d m_d(el) + \tilde{T}_w m_w(el) \quad (15)$$

$$m_d(el) = \frac{1}{\sin(el) + \frac{0.00143}{\tan(el) + 0.017}} \quad (16)$$

$$m_w(el) = \frac{1}{\sin(el) + \frac{0.00035}{\tan(el) + 0.017}} \quad (17)$$

Where el is the elevation of the transmitter relative to the receiver and may be determined from the line of sight unit vector $\hat{u}$. When the transmitter is located at higher elevations (el>15°), the mapping function of Equation 18 may be substituted for $m_d(el)$ and $m_w(el)$.

$$m(el) = \frac{1}{\sqrt{(1 - \cos(el)/1.001)^2}} \quad (18)$$

In some embodiments, other neutral atmosphere climate models and/or mapping functions may be used to determine the troposphere delay T. In some embodiments, the change in troposphere delay $\dot{T}$ as used in Equations 4 and/or 5 may be determined numerically from T.

At a process 560, an extrapolative step is taken. Using the various model elements determined during processes 520-550, either Equation 4 or Equation 5 may be used to provide one or more estimates for the first-order derivative of the carrier phase $\Phi$. Based on the first-order derivative, an extrapolation method based on differential equations, such as the Euler method, Runge-Kutta methods, and/or the like may be used to determine a high-accuracy estimate of the carrier phase $\Phi$ at a time slightly later than the previous estimate for the carrier phase Φ. Initially, the step may be taken from the initial conditions set during process 510, but processes 520-560 may be iteratively repeated to continue to take steps across the period of lost phase lock on the received signal. The iterations of processes 520-560 may continue until the period of lost phase lock on the received signal is over.

Referring back to FIG. 4, at a process 440, phase lock on the received signal is re-obtained when the radio navigation receiver begins to detect the received signal again. When this occurs, it may indicate an end in the period of lost phase lock on the received signal.

At a process 450, phase differences are corrected. Two types of phase differences may occur while the carrier reconstruction unit is reconstructing the carrier phase. The first type of phase difference is a typical byproduct of the extrapolation of the carrier phase during the period when phase lock on the received signal is lost. As the duration of the period of lost phase lock on the received signal becomes longer and larger numbers of extrapolative steps are taken during process 430, it is likely that the reconstructed phase may gradually drift from the actual phase of the received signal. This error or difference may be corrected by adjusting the reconstructed phase so that it matches the phase of the received signal. Correction of this error or difference in one step may, however, introduce an undesirably large step in the reconstructed continuous carrier wave signal that generally increases as the error becomes larger. In some embodiments, the effects of this step may be lessened by correcting the difference over time. For example, the extrapolation error may be corrected incrementally over the next cycle or next few cycles of the reconstructed carrier wave signal.

A second type of difference may be introduced by the transmitter. As some transmitters transmit the received signal, they may periodically introduce arbitrary signal changes that are not accounted for in the signal modeling of Equations 2-5. In some embodiments, receivers that are aware that these arbitrary signal changes are present may be able to improve the carrier phase reconstruction by accounting for them. In some examples, some transmitters may introduce these arbitrary signal changes whenever a frequency shift occurs when using FDMA or when a transmitter begins transmitting again after a TDMA time gap between signal segments In the case of Iridium, with the beginning of each 8.28 ms signal segment, the transmitters in the Iridium satellites may introduce a random or pseudorandom phase shift. In general, these random or pseudorandom phase shifts should not be propagated onto the reconstructed carrier wave signal as they are not related to the distance between the radio navigation receiver and the Iridium transmitter. In some embodiments, these random or pseudorandom phase shifts may be accounted for separately from the extrapolation error differences previously discussed. Consider the case where the transmitter may introduce from 0 to (n−1) phase shifts of (1/n) cycles in length. Depending upon the amount of phase shift detected between the extrapolated estimate and the received signal phase re-obtained in the phase lock of process 440, the phase shift or difference may be reduced by the amount shown in Equation 19.

| Phase Reduction | Observed Phase Difference | (19) |
|---|---|---|
| 0 | 0 to $\frac{1}{2n}$ cycles | |
| $\frac{i}{n}$ | $\frac{i-1/2}{n}$ to $\frac{i+1/2}{n}$ cycles; $i = 1, 2, \ldots, n-1$ | |

The phase reduction of Equation 18 may be used to prevent introducing the arbitrary signal changes of the transmitter into the reconstructed carrier wave signal. In some embodiments, this may be done by adjusting the phase detected in the received signal by the phase reduction of Equation 18 until the next loss in phase lock. Once the phase difference is reduced by the phase reduction of Equation 18, any remaining phase difference may be corrected as discussed above for the first type of phase difference. In some embodiments, the phase reduction of Equation 18 may be useful when the extrapolation phase error is generally smaller than the smallest introduced arbitrary signal change. For example, with a received signal from an Iridium satellite, some of whose signals are differentially-encoded with quadrature phase shift keying (DEQPSK) and may introduce random or pseudorandom quarter cycle phase shifts, when the extrapolation error of process 430 is larger than a quarter cycle, Equation 18 may incorrectly reduce the phase difference by assuming that part of it was the result of the random or pseudorandom phase shift. In some embodiments, the phase reduction of Equation 18 may be used whenever an arbitrary signal change is detected and/or suspected in the received signal, not just when accounting for phase differences following a period of lost phase lock.

At a process 460, the reconstructed carrier wave signal is generated. The carrier reconstruction unit uses the carrier phase and Equation 1 to generate the reconstructed carrier wave signal. While the radio navigation receiver maintains phase lock with the received signal, the carrier reconstruction unit may use the phase of the received signal or the phase of the received signal as adjusted for any phase reduction of Equation 18 and/or for any incremental removal of phase difference from the extrapolation over the last period of lost phase lock in the received signal to generate the phase of the reconstructed carrier wave signal. During periods when phase lock is lost, the reconstructed phase is used as the phase of the reconstructed carrier wave signal.

Figure 6:
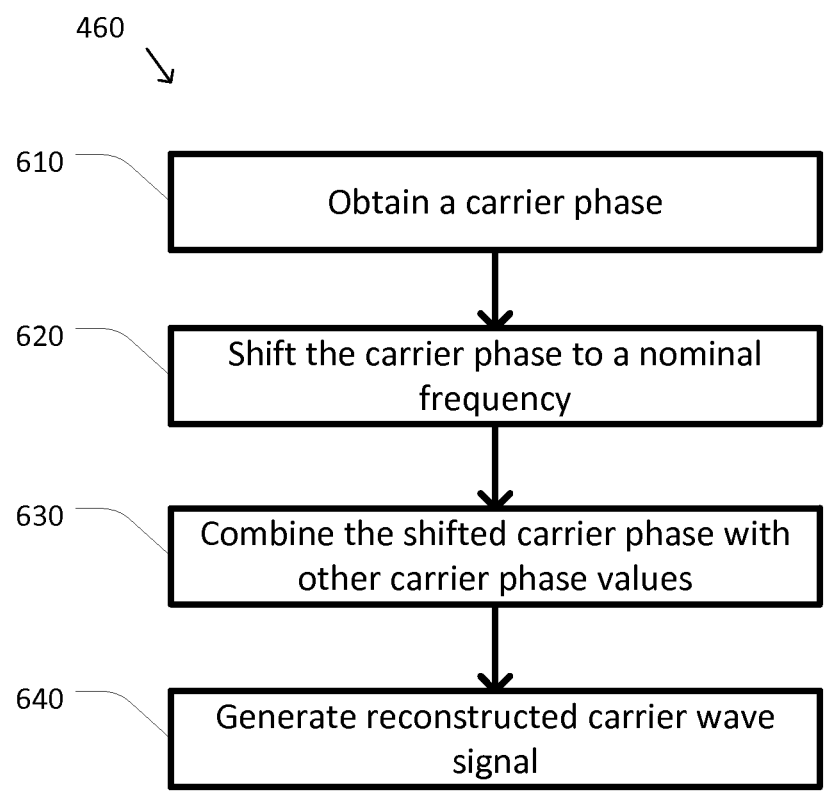
FIG. 6 is a simplified diagram of a process of generating a reconstructed carrier wave signal according to some embodiments.

In some embodiments, generation of the reconstructed carrier wave signal is a multi-step process. FIG. 6 is a simplified diagram of the process 460 of generating a reconstructed carrier wave signal according to some embodiments.

At a process 610, a carrier phase is obtained. As previously discussed, the carrier phase may be obtained from the phase of the received signal or the phase of the received signal as adjusted for any phase reduction of Equation 18 and/or for any incremental removal of phase difference from the extrapolation over the last period of lost phase lock in the received signal while the radio navigation receiver maintains phase lock with the received signal. Alternatively, the carrier phase may be obtained from the extrapolated value of the reconstructed carrier wave signal when a period of lost phase lock is being extrapolated across.

At a process 620, the carrier phase is shifted to a nominal frequency. Depending upon the nominal frequency of the received signal (e.g., 1575.42 MHz when the received signal is the GPS L1 signal) and the nominal frequency of the reconstructed carrier wave signal, the carrier phase obtained during process 610 may be adjusted. The adjustment accounts for the differences in angular frequency between the nominal frequency of the received signal and the nominal frequency. The adjustment is shown in Equation 20.

$$\Phi_0 = \frac{f_0}{f}(\Phi - I_{@f}) + I_{@f_0} \quad (20)$$

The phase shift of Equation 20 accounts for two separate frequency change factors. The first factor scales the carrier phase from the nominal frequency f of the received signal to the nominal frequency $f_0$. The second factor accounts for the ionosphere effects, which are removed before the phase is scaled, $I_{@f}$, and then reintroduced, $I_{@f_0}$, after the phase is scaled. Values for $I_{@f}$ and $I_{@f_0}$ may be determined using Equation 11 as adjusted to account for different frequency values. In some embodiments, when the received signal does not travel through the ionosphere, the ionospheric components of Equation 20 may be omitted. In some examples, because Equation 20 is based on the nominal frequency of the received signal, it preserves the Doppler and/or other frequency and/or phase effects that are present in the received signal and adapts them to the different nominal frequency of the reconstructed carrier wave. This allows the frequency shifted signal to be useful during carrier phase tracking.

At an optional process 630, the shifted carrier phase may be combined with other carrier phase values. Depending on the transmitter source used in the radio navigation system, it may be possible for the radio navigation receiver to receive multiple signals from the same transmitter. For example, the Iridium satellites may be transmitting multiple signals associated with different communication streams. Each of the multiple received signals may be used as a source of phase information that may be used to generate the reconstructed carrier wave signal. In effect, the phase of each of the received signals may be tracked via phase lock and extrapolation using processes 410-450. After accounting for any initial offset in phase between the received signals, each of the received signals may be used to generate a $\Phi_0$ value (denoted by $\Phi_{0,i}$ for the phase value attributed to the ith received signal) that may contribute valuable information to the phase of the reconstructed carrier wave signal and ultimately to the range between the transmitter and the receiver. In some embodiments, a Bayesian-style approach may be used to combine each of the nominal phase values $\Phi_{0,i}$ for each of the M received signals, as shown in Equation 21.

$$\Phi_0 = \frac{\sum_{i=1}^{M} \frac{\Phi_{0,i}}{\sigma_{0,i}^2}}{\sum_{i=1}^{M} \frac{1}{\sigma_{0,i}^2}} \quad (21)$$

Where $\sigma_{0,i}^2$ is an estimated noise variance for each of the phase values $\Phi_{0,i}$. Depending upon the embodiment, the estimated noise variance may account for the signal to noise ratio in the received signal, the quality of the phase locking to the received signal, the estimated modeling error, and/or the like.

At a process 640, the reconstructed carrier wave signal is generated. Using the determined carrier phase $\Phi_0$ and the nominal frequency $f_0$, the continuous reconstructed carrier wave signal is generated using Equation 1. In some embodiments, the reconstructed carrier wave signal may be passed to a GPS unit, such as positioning unit 360, to be used during determination of the position of the radio navigation receiver. This permits the GPS unit to be used for position determination when radio signal sources other GPS satellites are used or to address losses in phase lock in received signals and/or arbitrary signal changes introduced by transmitters. In some embodiments, multiple signals from the same transmitter may also be used to provide a more accurate reconstructed carrier wave signal.

As discussed above and further emphasized here, FIGS. 4-6 are merely examples which should not unduly limit the scope of the claims. One of ordinary skill in the art would recognize many variations, alternatives, and modifications. In some embodiments, process 460 may generate other outputs than a reconstructed carrier wave signal. In some examples, a carrier phase observable may be reconstructed. In some examples, a radio frequency (RF) signal and/or an intermediate frequency (IF) signal suitable for tracking by a GNSS receiver may be reconstructed.

In some embodiments, method 400 may be adapted to reconstruct the carrier wave signal in other ways. In some examples, the reconstruction of process 430 may be adapted to reconstruct the carrier wave signal backward in time from before a period of phase lock. In some examples, the reconstruction of process 430 may be adapted to reconstruct the carrier wave signal in both directions by reconstructing forward from the end of a first period of phase lock and backward from the beginning of a second period of phase lock.

Some embodiments of the carrier reconstruction unit 330 may include non-transient, tangible, machine readable media that include executable code that when run by one or more processors may cause the one or more processors (e.g., the processing unit 340) to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
   one or more processors;
   memory coupled to the one or more processors; and
   a radio navigation receiver for receiving a signal from a transmitter, the signal having a phase;
   wherein the one or more processors are configured to perform operations comprising:
     obtaining a phase lock on the received signal;
     extracting first phase information from the received signal;

detecting a loss in phase lock on the received signal; and extrapolating second phase information while phase lock is lost using a model of the phase, the extrapolating comprising:
  determining a relative velocity between the radio navigation receiver and the transmitter; and
  determining the second phase information based at least in part on the relative velocity.

2. The system of claim 1, the operations further comprising:
  reconstructing a carrier signal based on the first and second phase information; and
  providing the reconstructed carrier signal to a positioning unit.

3. The system of claim 1 wherein:
  the received signal has a first nominal frequency; and
  the one or more processors are further configured to scale the first and second phase information to a second nominal frequency different from the first nominal frequency.

4. The system of claim 3 wherein the one or more processors are further configured to account for differing ionospheric effects at the first and second nominal frequencies when scaling the first and second phase information.

5. The system of claim 1 wherein the one or more processors are further configured to:
  reobtain phase lock on the received signal;
  extract third phase information from the received signal; and
  correct for a phase difference between the second phase information and the third phase information.

6. The system of claim 5 wherein the one or more processors are further configured to correct the phase difference gradually.

7. The system of claim 6 wherein the one or more processors are further configured to correct the phase difference over at least one cycle of the received signal.

8. The system of claim 5 wherein:
  the phase difference includes an arbitrary signal change introduced by the transmitter; and
  the one or more processors are further configured to adjust the third phase information to remove the arbitrary signal change.

9. The system of claim 1 wherein the one or more processors are further configured to combine the first and second phase information with additional phase information associated with a second signal received from the transmitter.

10. The system of claim 1 wherein:
  the phase model includes a model of a derivative of the phase; and the one or more processors are further configured to:
  determine a position and a velocity of the transmitter;
  determine a position and a velocity of the radio navigation receiver;
  determine clock drift and bias for the radio navigation receiver;
  determine transmission media effects; and
  apply the model of the derivative of the phase based on the determined transmitter position and velocity, the radio navigation receiver position and velocity, the radio navigation receiver clock drift and bias, and the transmission media effects.

11. The system of claim 10 wherein determining the transmitter position and velocity is based at least in part on ephemerides.

12. The system of claim 10 wherein the radio navigation receiver position and velocity are determined based at least in part on previous position estimates for the radio navigation receiver.

13. The system of claim 10 wherein:
  the radio navigation receiver position is determined based on a previous position estimate for the radio navigation receiver; and
  the radio navigation receiver velocity is received from an inertial navigation system.

14. The system of claim 10 wherein the transmission media effects include ionospheric effects.

15. The system of claim 10 wherein the transmission media effects include tropospheric effects.

16. A method for reconstructing a carrier signal in a radio navigation receiver, the method comprising:
  receiving a signal from a transmitter, the received signal having a phase;
  obtaining phase lock on the received signal;
  extracting first phase information from the received signal;
  detecting a loss in phase lock on the received signal;
  extrapolating second phase information while phase lock is lost using a model of the phase, the extrapolating comprising:
    determining a relative velocity between the radio navigation receiver and the transmitter; and
    determining the second phase information based at least in part on the relative velocity; and
  reconstructing a carrier signal based on the first and second phase information.

17. The method of claim 16, further comprising scaling the first and second phase information to a first nominal frequency different from a second nominal frequency of the received signal.

18. The method of claim 17, wherein the scaling accounts for differing ionospheric effects at the first and second nominal frequencies.

19. The method of claim 16, further comprising:
  reobtaining phase lock on the received signal;
  extracting third phase information from the received signal;
  correcting for a phase difference between the second phase information and the third phase information; and
  reconstructing the carrier signal further based on the third phase information.

20. The method of claim 19, further comprising adjusting the third phase information to remove an arbitrary signal change introduced by the transmitter.

21. The method of claim 16, further comprising combining the first and second phase information with additional phase information associated with a second signal received from the transmitter.

22. The method of claim 16, wherein extrapolating the second phase information comprises:
  determining clock drift and bias for the radio navigation receiver;
  determining transmission media effects; and
  applying a model of a derivative of the phase based on the determined transmitter position and velocity, the radio navigation receiver position and velocity, the radio navigation receiver clock drift and bias, and the transmission media effects.

23. A non-transitory machine-readable medium comprising a first plurality of machine-readable instructions which when executed by one or more processors are adapted to cause the one or more processors to perform operations comprising:

receiving, by a radio navigation receiver, a signal from a transmitter, the received signal having a phase;

obtaining a phase lock on the received signal;

extracting first phase information from the received signal;

detecting a loss in phase lock on the received signal;

determining a position and a velocity of the transmitter;

determining a position and a velocity of the radio navigation receiver;

determining clock drift and bias for the radio navigation receiver;

determining transmission media effects;

applying a model of a derivative of the phase based on the determined transmitter position and velocity, the radio navigation receiver position and velocity, the radio navigation receiver clock drift and bias, and the transmission media effects to extrapolate second phase information while phase lock is lost; and reconstructing a carrier signal based on the first and second phase information.

24. The non-transitory machine-readable medium of claim 23, further comprising a second plurality of machine-readable instructions which when executed by the one or more processors are adapted to cause the one or more processors to perform operations comprising scaling first, second, and third phase information to a first nominal frequency different from a second nominal frequency of the received signal, the scaling accounting for differing ionospheric effects at the first and second nominal frequencies.

25. The non-transitory machine-readable medium of claim 23, further comprising a second plurality of machine-readable instructions which when executed by the one or more processors are adapted to cause the one or more processors to perform a method comprising:

reobtaining phase lock on the received signal;

extracting third phase information from the received signal; and correcting for a phase difference between the second phase information and the third phase information; and reconstructing the carrier signal further based on the third phase information.

26. The non-transitory machine-readable medium of claim 25, further comprising a third plurality of machine-readable instructions which when executed by the one or more processors are adapted to cause the one or more processors to perform a method comprising adjusting the third phase information to remove an arbitrary signal change introduced by the transmitter.

27. The non-transitory machine-readable medium of claim 23, further comprising a second plurality of machine-readable instructions which when executed by the one or more processors are adapted to cause the one or more processors to perform a method comprising combining the first and second phase information with additional phase information associated with a second signal received from the transmitter.

\* \* \* \* \*